(12) United States Patent
Wamprecht et al.

(10) Patent No.: US 7,462,680 B2
(45) Date of Patent: Dec. 9, 2008

(54) BINDER COMBINATIONS FOR HIGHLY RESISTANT PLASTIC PAINTS

(75) Inventors: Christian Wamprecht, Neuss (DE); Jörg Tillack, Berg.-Gladbach (DE)

(73) Assignee: Bayer MaterialScience AG, Leverkusen (DE)

( * ) Notice: Subject to any disclaimer, the term of this patent is extended or adjusted under 35 U.S.C. 154(b) by 616 days.

(21) Appl. No.: 10/897,866

(22) Filed: Jul. 23, 2004

(65) Prior Publication Data
US 2005/0027095 A1    Feb. 3, 2005

(30) Foreign Application Priority Data
Jul. 30, 2003    (DE)    ................ 103 34 723

(51) Int. Cl.
C08G 18/40    (2006.01)
C08G 18/42    (2006.01)
C08G 63/08    (2006.01)

(52) U.S. Cl. .............. 528/80; 528/81; 528/83; 528/318; 528/48

(58) Field of Classification Search .............. 528/48, 528/80, 81, 83, 318
See application file for complete search history.

(56) References Cited

U.S. PATENT DOCUMENTS

| | | | |
|---|---|---|---|
| 3,124,605 A | 3/1964 | Wagner | 260/453 |
| 3,358,010 A | 12/1967 | Britain | 260/453 |
| 3,808,160 A * | 4/1974 | Steinmetz | 524/733 |
| 3,903,127 A | 9/1975 | Wagner et al. | 260/453 AB |
| 3,954,899 A | 5/1976 | Chang et al. | 260/849 |
| 3,989,676 A | 11/1976 | Gerkin et al. | 260/77.5 AN |
| 4,264,519 A | 4/1981 | Hennig et al. | 260/453 AB |
| 4,288,586 A | 9/1981 | Bock et al. | 528/67 |
| 4,292,255 A | 9/1981 | Hennig et al. | 260/453 AR |
| 4,324,879 A | 4/1982 | Bock et al. | 528/45 |
| 4,419,513 A | 12/1983 | Breidenbach et al. | 544/222 |
| 4,487,928 A | 12/1984 | Richter et al. | 544/193 |
| 4,518,761 A | 5/1985 | Richter et al. | 528/67 |
| 4,692,384 A | 9/1987 | Pedain et al. | 428/423.3 |
| 4,814,413 A * | 3/1989 | Thibaut et al. | 528/80 |
| 4,894,430 A | 1/1990 | Höhlein et al. | 528/75 |
| 5,115,073 A * | 5/1992 | Meckel et al. | 528/83 |
| 5,136,612 A | 8/1992 | Bi | |
| 5,282,155 A | 1/1994 | Jones | |
| 5,319,056 A | 6/1994 | Wamprecht et al. | 528/49 |
| 5,574,102 A | 11/1996 | Tanigami et al. | 525/124 |
| 5,764,646 A | 6/1998 | Dent | |
| 5,914,383 A | 6/1999 | Richter et al. | 528/59 |
| 6,047,020 A | 4/2000 | Hottinen | |
| 6,090,939 A | 7/2000 | Richter et al. | 544/67 |
| 6,107,484 A | 8/2000 | Richter et al. | 544/67 |
| 6,161,209 A | 12/2000 | Moher | |
| 6,178,196 B1 | 1/2001 | Naguib et al. | |
| 6,327,314 B1 | 12/2001 | Cimini, Jr. et al. | |
| 6,359,935 B1 | 3/2002 | Hui et al. | |
| 6,458,898 B1 | 10/2002 | Wamprecht et al. | 525/440 |
| 6,460,160 B1 | 10/2002 | Classon | |
| 6,477,210 B2 | 11/2002 | Chuang et al. | |
| 6,483,821 B1 | 11/2002 | Dabak et al. | |
| 6,539,067 B1 | 3/2003 | Luschi et al. | |
| 6,650,714 B2 | 11/2003 | Dogan et al. | |
| 6,671,338 B1 | 12/2003 | Gamal et al. | |
| 6,687,492 B1 | 2/2004 | Sugar et al. | |
| 6,700,919 B1 | 3/2004 | Papasakellariou | |
| 6,704,376 B2 | 3/2004 | Mills et al. | |
| 2001/0017903 A1 | 8/2001 | Naguib et al. | |
| 2001/0053143 A1 | 12/2001 | Li et al. | |
| 2002/0067782 A1 | 6/2002 | Wilhelmsson | |
| 2002/0168017 A1 | 11/2002 | Berthet et al. | |
| 2002/0181509 A1 | 12/2002 | Mody et al. | |
| 2003/0095590 A1 | 5/2003 | Fuller et al. | |
| 2003/0103584 A1 | 6/2003 | Bjerke et al. | |
| 2003/0128656 A1 | 7/2003 | Scarpa | |
| 2003/0156534 A1 | 8/2003 | Coulson et al. | |
| 2003/0161415 A1 | 8/2003 | Krupka | |
| 2003/0236081 A1 | 12/2003 | Braun | |
| 2004/0001564 A1 | 1/2004 | Chan et al. | |
| 2004/0004997 A1 | 1/2004 | Boesel et al. | |
| 2004/0008614 A1 | 1/2004 | Matsuoka et al. | |
| 2004/0047435 A1 | 3/2004 | Su | |

FOREIGN PATENT DOCUMENTS

| | | |
|---|---|---|
| EP | 1 195 908 | 10/2002 |
| EP | 1 387 544 | 4/2004 |
| GB | 1060430 | 3/1967 |
| GB | 1 234 972 | 6/1971 |
| GB | 1 506 373 | 4/1976 |
| GB | 1 458 564 | 12/1976 |

(Continued)

OTHER PUBLICATIONS

Journal of Applied Polymer Science, vol. 29, (month unavailable) 1984, pp. 2261-2270, Adolf Balas et al, "Properties of Cast Urethane Elastomers Prepared from Poly($\epsilon$-caprolactone)s".

Primary Examiner—Rabon Sergent
Assistant Examiner—Benjamin Gillespie
(74) Attorney, Agent, or Firm—Noland J. Cheung; Robert S. Klemz

(57) ABSTRACT

Binder combinations containing polyisocyanates, special lactone-based polyols and polyester polyols and to their use for producing coatings, preferably on plastics.

19 Claims, No Drawings

FOREIGN PATENT DOCUMENTS

| | | |
|---|---|---|
| GB | 2 287 469 | 9/1995 |
| JP | 2002-232389 A | 8/2002 |
| WO | WO 01/41387 | 6/2001 |
| WO | WO 02/23781 | 3/2002 |
| WO | WO 03/013024 | 2/2003 |
| WO | WO 2004/006525 | 1/2004 |

\* cited by examiner

BINDER COMBINATIONS FOR HIGHLY RESISTANT PLASTIC PAINTS

CROSS REFERENCE TO RELATED PATENT APPLICATION

The present patent application claims the right of priority under 35 U.S.C. §119 (a)-(d) of German Patent Application No.103 34 723.2, filed Jul. 3, 2003.

FIELD OF THE INVENTION

The present invention relates to new binder combinations comprising polyisocyanates, special lactone-based polyols and polyester polyols and to their use for producing coatings, preferably on plastics.

BACKGROUND OF THE INVENTION

Paint formulations for producing weathering-resistant and chemical-resistant, high-flexibility coatings on plastics are of great interest owing to the increasing use of plastics for high-value applications, for example in vehicle construction. A central problem there, however, is the provision of polyols which give the cured coating maximum flexibility in conjunction with high hardness, excellent low-temperature flexibility and very good resistance properties, such as resistance to weathering, to tar and to solvents and other chemicals.

Paints based on polyester polyols as described for example in EP-A 166 962, EP-A 318 800, EP-A 571 829 or EP-A 650 992 are distinguished in relation to polyacrylate polyols in particular by very high flexibility, particularly at low temperatures down to about −45° C., by high hiding power in conjunction with effective levelling, and by high gloss. Problems, however, are their solvent resistance and chemical resistance, which are no more than moderate, and a deficiency in their surface hardness. Polyacrylate polyols, on the other hand, do not attain flexibility properties comparable with polyester polyols.

It was therefore an object of the present invention to provide new polyol components which combine the known advantages of the polyester polyols with those of the polyacrylate polyols and lead to coating systems which at one and the same time meet the following requirements:

1. Yellowing-free film surfaces on exposure to heat (thermal yellowing): the paint film must withstand exposure to heat (120° C.) over a period of at least 20 h without substantial yellowing (increase in ΔE<3).
2. Low-temperature elasticity: even at −20° C. the film must not tear when the plastic is deformed.
3. Resistance to solvents and other chemicals and to tar spots: the paint film must withstand exposure to solvents and other chemicals and to a special test solution containing tar and must do so without damage.
4. Effective gloss retention and high scratch resistance: the paint film on the plastics parts ought to have maximum durability and, under mechanical exposure and effects of weathering, should not become scratched more rapidly and/or lose gloss more rapidly than the paint film on the metal bodywork (DIN 67 530, ISO 2813).
5. No later embrittlement on weathering: even after prolonged weathering the film must not show any loss in low-temperature elasticity.
6. Low drying temperature in combination with extremely short drying times, for reasons of energy saving and to allow even heat-sensitive plastics parts to be painted. Additionally, drying temperatures <80° C. allow the systems to be used in automotive refinish paints, so that they are suitable not only for original (OEM) finishing.
7. Paint film hardness: in combination with a low-temperature elasticity of −40° C. the paint film ought to attain a hardness of >80 s (König pendulum damping). At a low-temperature elasticity of −20° C. the paint film hardness ought to reach a value of at least 125 s.

Furthermore, the polyol components ought to have a very low viscosity (<3000 mPas/23° C.) in combination with a very high solids (>70% by weight), in order to allow them to be used in low-solvent coating systems.

SUMMARY OF THE INVENTION

The present invention is directed to binder compositions that contain A) one or more polyols, B) one or more lactone-based polyols having an average OH functionality of $\geq 2$, C) one or more OH-reactive polyisocyanates having an NCO functionality of $\geq 2$, and D) optionally solvents, auxiliaries and additives. The polyols in A) include one or more polyester polyols having an OH number of from 50 to 300 mg KOH/g. The polyols are obtainaned by reacting a) 40 to 48 mol % of a carboxylic acid component containing a1) one or more aliphatic, cycloaliphatic, araliphatic or aromatic carboxylic acids with a COOH functionality of $\geq 2$, or anhydrides thereof, and a2) optionally, aromatic, cycloaliphatic, araliphatic and/or aliphatic monocarboxylic acids; with b) 52 to 60 mol % of an alcohol component containing b1) one or more aliphatic, cycloaliphatic or araliphatic polyols with a number-average molecular weight of from 62 to 272 g/mol and an average OH functionality of $\geq 2$, and b2) optionally, aliphatic, cycloaliphatic and/or araliphatic monoalcohols.

The present invention is also directed to a method of coating primed or unprimed substrates including applying a coating composition containing the above-described binder composition.

The present invention is further directed to coatings obtained from coating compositions containing the above-described binder compositions as well as substrates coated therewith.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

It has now been found that polyol components based on polyester polyols in combination with special lactone-based polyester polyols lead to polyurethane coatings which meet the requirements specified above for coating systems.

The invention accordingly provides binder compositions comprising

A) one or more polyester polyols having an OH number of from 50 to 300 mg KOH/g and obtainable by reacting
  a) 48 to 40 mol % of a carboxylic acid component comprising
    a1) one or more aliphatic, cycloaliphatic, araliphatic or aromatic carboxylic acids with a COOH functionality $\geq 2$, or anhydrides thereof, and
    a2) if desired, aromatic, cycloaliphatic, araliphatic and/ or aliphatic monocarboxylic acids with
b) 52 to 60 mol % of an alcohol component comprising
  b1) one or more aliphatic, cycloaliphatic or araliphatic polyols with a number-average molecular weight of from 62 to 272 g/mol and an average OH functionality ≧2 and
  b2) if desired, aliphatic, cycloaliphatic and/or araliphatic monoalcohols,
B) one or more lactone-based polyols having an average OH functionality ≧2,
C) one or more OH-reactive polyisocyanates having an NCO functionality ≧2, and
D) optionally solvents, auxiliaries and additives.

In component a1) it is possible to use all aromatic dicarboxylic or polycarboxylic acids and dicarboxylic or polycarboxylic anhydrides having at least 2 carboxylic acid groups and preferably 8-10 carbon atoms. Particular preference is given to phthalic acid, isophthalic acid, terephthalic acid, trimellitic acid, phthalic anhydride, trimellitic anhydride, pyromellitic acid and pyromellitic dianhydride, and very particular preference to phthalic anhydride and isophthalic acid.

In component a1) it is possible to use all aliphatic saturated dicarboxylic acids and dicarboxylic anhydrides having preferably 2-14 carbon atoms and/or their anhydrides. Particular preference is given to oxalic acid, succinic acid, glutaric acid, adipic acid, dodecanedioic acid and tetradecanedioic acid, and very particular preference to adipic acid.

In component a1) it is possible to use all aliphatic unsaturated dicarboxylic acids and dicarboxylic anhydrides having preferably 4-6 carbon atoms and/or their anhydrides. Particular preference is given to fumaric acid, maleic acid and itaconic acid and/or the possible anhydrides of these acids. Very particular preference is given to maleic anhydride.

In component a1) it is possible to use all cycloaliphatic saturated or unsaturated dicarboxylic acids and dicarboxylic anhydrides having preferably 6-11 carbon atoms and/or their anhydrides. Particular preference is given to tetrahydrophthalic acid, hexahydrophthalic acid, tetrahydrophthalic anhydride, hexahydrophthalic anhydride and norbornenedicarboxylic acid; very particular preference is given to hexahydrophthalic anhydride.

In component a2) it is possible to use all monobasic aromatic, aliphatic, araliphatic or cycloaliphatic, optionally unsaturated, carboxylic acids having preferably 1 to 18 carbon atoms. Particular preference is given to formic acid, acetic acid, propionic acid, butyric acid, isobutyric acid, valeric acid, 2-methylbutanoic acid, 3-methylbutanoic acid, 2,2-dimethylpropanoic acid, 2-ethylbutanoic acid, 2-ethylhexanoic acid, octanoic acid, decanoic acid, dodecanoic acid, tetradecanoic acid, hexadecanoic acid, octadecanoic acid, saturated and unsaturated $C_{16}$-$C_{18}$ fatty acids, benzoic acid, phenylacetic acid, cyclohexanecarboxylic acid and cyclohexenoic acid. Very particular preference is given to 2-ethylhexanoic acid, saturated and unsaturated $C_{16}$-$C_{18}$ fatty acids, benzoic acid and cyclohexanecarboxylic acid.

The compounds of component a1) and a2) respectively can be used either individually or else in any desired mixtures with one another.

In component b1) it is possible to use all dihydric, aliphatic alcohols, optionally containing ether oxygen atoms, and having at least 2, preferably 2 to 12, carbon atoms. Particular preference is given to ethylene glycol, propane-1,2-diol and -1,3-diol, butane-1,2-diol and -1,4-diol, diethylene glycol, pentane-1,5-diol, hexane-1,6-diol, neopentyl glycol, 2-ethyl-2-butylpropanediol, 2-ethyl-1,3-hexanediol, decane-1,10-diol, dodecane-1,2-diol and -1,12-diol; very particular preference is given to ethyleneglycol, propane-1,2-diol, neopentyl glycol and hexane-1,6-diol.

In component b1) it is possible to use all dihydric, cycloaliphatic alcohols, optionally containing ether oxygen atoms, and having at least 4, preferably 6 to 15, carbon atoms. Particular preference is given to cyclohexanedimethanol, cyclohexane-1,2-diol, -1,3-diol and -1,4-diol, 2,2-bis(4-hydroxycyclo-hexyl)propane and octahydro-4,7-methano-1H-indenedimethanol.

In component b1) it is possible to use all higher-than-dihydric aliphatic and araliphatic alcohols having at least 3, preferably 3 to 6, carbon atoms. Particular preference is given to glycerol, trimethylolpropane, trimethylolethane, pentaerythritol and sorbitol.

In component b2) it is possible to use all monohydric, aliphatic, araliphatic or cycloaliphatic alcohols having 1 to 18, preferably 1 to 12, carbon atoms. Particular preference is given to ethanol, 1- and 2-propanol, 1- and 2-butanol, isobutanol, tert-butanol, 1-, 2- and 3-pentanol, 2-methyl-1-butanol, 3-methyl-1-butanol, 2,2-dimethylpropanol, 1-, 2- and 3-hexanol, 4-methyl-2-pentanol, 2-ethyl-1-butanol, 2,2-dimethylpropanol, 1-octanol, 2-ethyl-1-hexanol, 1-nonanol, trimethyl-1-hexanol, 1-decanol, 1-dodecanol, 1-tetradecanol, 1-hexadecanol, 1-octadecanol, cyclohexanol, 2-, 3- and 4-methylcyclohexanol, hydroxymethylcyclohexane, 3,3,5-trimethylcyclohexanol, 4-tert-butylcyclohexanol, 1-methyl-4t-isopropyl-cyclohexanol (i.e. (−)-menthol), decahydro-2-naphthol, (1R-endo)-1,7,7-trimethyl-bicyclo[2.2.1]heptan-2-ol, (1R-exo)-1,7,7-trimethylbicyclo[2.2.1]heptan-2-ol and (1R)-6,6-dimethyl-bicyclo[3.1.1]hept-2-ene-2-methanol.
Very particular preference is given to 1-hexanol, 2-ethylhexanol and cyclohexanol.

The compounds of component b 1) and b2) respectively can be used either individually or else in any desired mixtures with one another.

The compounds of component B) are prepared by reacting alcohols with cyclic lactones. If desired they can be further reacted thereafter with compounds containing carbonate groups, such as dimethyl carbonate and diphenyl carbonate, for example, to form polyols containing ester groups and carbonate groups.

The compounds of component B) are preferably ε-caprolactone-based polyols having an average OH functionality of ≧2, preferably ≧2.5, more preferably ≧3, a number-average molecular weight of from 119 to 2500, preferably from 119 to 2200, more preferably from 119 to 2000 and very preferably from 119 to 1500 g/mol. The hydroxyl content of the polyols of component B) is from 1.0 to 50% by weight, preferably from 1.3 to 45% by weight, more preferably from 1.6 to 40% by weight and very preferably from 9.0 to 36% by weight.

The preparation of the polyols of component B) employs monomeric or oligomeric polyols having an average OH functionality ≧2 which are reacted with ε-caprolactone in a ring-opening reaction. Examples of suitable polyols in this context include ethylene glycol, diethylene glycol, propylene glycol, butane-1,4-diol, hexane-1,6-diol, cyclohexane-1,4-dimethanol, trimethylolpropane, trimethylolethane, pentaerythritol, trishydroxyethyl isocyanurate, glycerol and sorbitol.

The reaction of the specified starting polyols with ε-caprolactone is known to the person skilled in the art [A. Balas, G. Palka, J. Foks and H. Janik, J. Appl. Polym. Sci. 29 (1984) 2261] and takes place at temperatures from 100 to 250° C., preferably from 120 to 200° C. and more preferably from 140 to 180° C. It can be accelerated by means of catalysts, examples being organotin compounds such as dibutyltin dilaurate.

The resultant, ε-caprolactone-modified polyols can be modified further by reaction, for example, with diphenyl carbonate or dimethyl carbonate to form ε-caprolactone-modified polyols containing carbonate groups and ester groups.

The above-described ε-caprolactone-based polyols of component B) are pale-coloured viscous resins whose compatibility with the polyesters of component A) is good.

The hydroxyl content (based on resin solids) of binder components A) and B) together amounts to from 4.0 to 20.0% by weight, preferably from 4.5 to 17.0% by weight, more preferably from 5.0 to 14.0% by weight and very preferably from 5.5 to 12.0% by weight.

Besides the polyols of components A) and B) it is also possible in principle to use further organic polyhydroxyl compounds and/or amine-type reactive diluents that are known from polyurethane coatings technology. These other polyhydroxyl compounds can be the customary polyether, polycarbonate, polyurethane, polyester or polyacrylate polyols.

As further organic polyhydroxyl compounds, if such compounds are employed at all, in addition to A) and B), it is preferred to use the prior art polycarbonate polyols, polyester polyols and/or polyacrylate polyols that are known per se. The amine-type reactive diluents can be products containing blocked amino groups, such as aldimines or ketimines, for example, or products containing amino groups which, while still free, are attenuated in their reactivity, such as aspartic esters, for example. As a general rule the amine-type reactive diluents contain more than one (blocked) amino group, and hence in the crosslinking reaction they contribute to the construction of the polymeric paint film network.

In the case of the inventive use of the binder components essential to the invention, composed of A) and B), these components can be employed as a blend with up to 50%, preferably up to 30%, by weight of other polyols and/or amine-type reactive diluents of the kind exemplified.

With particular preference, however, polyols of components A) and B) are used exclusively.

As crosslinkers of component C) it is preferred to use the polyisocyanates that are known per se in paint chemistry and contain urethane, uretdione, allophanate, biuret, iminooxadiazinedione and/or isocyanurate groups, where appropriate in wholly or partly NCO-blocked form, these polyisocyanates being obtainable by modifications, known to the person skilled in the art, of monomeric aliphatic, cycloaliphatic, araliphatic and/or aromatic diisocyanates. Examples of diisocyanates include 1,6-diisocyanatohexane, 1-isocyanato-3,3,5-trimethyl-5-isocyanatomethylcyclohexane (isophorone diisocyanate), 4,4'-diisocyanato-dicyclohexylmethane, 1,4-diisocyanatocyclohexane, 1-methyl-2,4-diisocyanato-cyclohexane, 1-methyl-2,6-diisocyanatocyclohexane, 4-isocyanatomethyl-1,8-octane diisocyanate and mixtures thereof.

If desired it is also possible for diisocyanatotoluene (TDI) and its isomer mixtures with up to 35% by weight of 2,6-diisocyanatotoluene, based on the total amount of TDI, to be present in C).

The preparation of these paint polyisocyanates starting from monomeric diisocyanates is familiar to the person skilled in the art and is described on the following pages with reference to relevant literature. It is immaterial in this case whether the diisocyanates employed have been prepared by phosgene or non-phosgene processes.

The paint polyisocyanates of the above-mentioned kind preferably have an NCO group content of from 2 to 25% by weight, an average NCO functionality of from 2.0 to 5.0, more preferably from 2.8 to 4.0, and a residue of monomeric diisocyanates employed for their preparation that amounts to less than 1% by weight, more preferably less than 0.5% by weight.

Preferred paint polyisocyanates of the aforementioned kind are those containing aliphatically and/or cycloaliphatically attached, free isocyanate groups.

The aforementioned paint polyisocyanates may also contain wholly or partly blocked NCO groups. Methods of preparing blocked polyisocyanates and also blocking reagents are known to the person skilled in the art. Preferred blocking agents are, for example, ε-caprolactam, butanone oxime, triazole, phenol, phenol derivatives, secondary amines and/or alkyl malonates.

Paint polyisocyanates containing urethane groups are, for example, the reaction products of 2,4- and optionally 2,6-diisocyanatotoluene or 1-methyl-2,4- and optionally 1-methyl-2,6-diisocyanatocyclohexane with substoichiometric amounts of trimethylolpropane or mixtures thereof with simple diols, such as the isomeric propanediols or butanediols, for example. The preparation of paint polyisocyanates of this kind containing urethane groups in virtually monomer-free form is described in DE-A 109 01 96, for example.

Particularly preferred paint polyisocyanates are those of the aforementioned kind containing biuret, isocyanurate and/or iminooxadiazinedione structures.

Paint polyisocyanates containing biuret groups, and their preparation, are described, for example, in EP-A 0 003 505, DE-A 110 139 4, U.S. Pat. Nos. 3,358,010 or 3,903,127.

The paint polyisocyanates containing isocyanurate groups include the simple or mixed trimers of the diisocyanates exemplified above, such as, for example, the TDI-based polyisocyanates containing isocyanurate groups of GB-A 1 060 430, GB-A 1 506 373 or GB-A 1 458 564, the mixed trimers of TDI with 1,6-diisocyanatohexane, which are obtainable, for example, in accordance with DE-A 164 480 9 or DE-A 314 467 2. Particularly preferred paint polyisocyanates containing isocyanurate groups are the aliphatic, aliphatic/cycloaliphatic and/or cycloaliphatic trimers or mixed trimers based on 1,6-diisocyanatohexane and/or isophorone diisocyanate, which are obtainable, for example, in accordance with U.S. Pat. No. 4,324,879, U.S. Pat No. 4,288,586, DE-A 310 026 2, DE-A 310 026 3, DE-A 303 386 0 or DE-A 314 467 2.

Paint polyisocyanates containing iminooxadiazinedione groups, and their preparation, can be found for example in EP-A 798 299, EP-A 896 009, EP-A 962 454 and EP-A 962 455.

In the binder compositions of the invention the ratio between OH-reactive functions of component C) and the hydroxyl groups of components A)+B) is from 5:1 to 1:2, preferably from 1.5:1 to 1:1.2.

In one preferred embodiment of the invention the mixture of components A) to C) is composed of from 65 to 40 parts by weight of A), from 1 to 25 parts by weight of B) and from 25 to 59 parts by weight of C), the stated amounts adding up to 100.

In one particularly preferred embodiment of the invention the mixture of components A) to C) is composed of from 60 to 40 parts by weight of A), from 5 to 20 parts by weight of B) and from 30 to 50 parts by weight of C), the stated amounts adding up to 100.

As well as components A)-C) and also component D) the binder compositions of the invention may include the solvents known per se to the person skilled in the art and also auxiliaries and additives.

Examples of optional solvents include the following: ethyl acetate, n-propyl acetate, isopropyl acetate, n-butyl acetate, n-hexyl acetate, n-heptyl acetate, 2-ethylhexyl acetate, methoxypropyl acetate, methyl ethyl ketone, methyl isobutyl ketone, toluene, xylene, higher aromatics mixtures, white spirit or any desired mixtures of these solvents.

Where solvents are used their amount, based on the overall binder composition, is from 5 to 50% by weight, preferably from 10 to 45% by weight.

Examples of further auxiliaries and additives for optional use include plasticizers, such as tricresyl phosphate, phthalic diesters, chlorinated paraffins; pigments and fillers, such as titanium dioxide, barium sulphate, chalk, carbon black; catalysts, such as N,N-dimethylbenzylamine, N-methylmorpholine, zinc octoate, tin(II) octoate or dibutyltin dilaurate; levelling agents; thickeners; if desired, stabilizers, such as substituted phenols; silanes with organic functional groups as adhesion promoters, and also light stabilizers and UV absorbers. Examples of such light stabilizers include sterically hindered amines, as described for example in DE-A 241 735 3 and DE-A 245 686 4. Particularly preferred light stabilizers are bis(1,2,2,6,6-pentamethylpiperid-4-yl) sebacate, bis(2,2, 6,6-tetramethylpiperid-4-yl) sebacate and bis(1,2,2,6,6-pentamethylpiperid-4-yl) n-butyl-(3,5-di-tert-butyl-4-hydroxybenzyl)malonate.

The moisture adhering to the fillers and pigments can be removed by drying beforehand or by using water absorbers, such as molecular sieve zeolites, for example.

The solvents, auxiliaries and additives can be added either to the finished mixture of components A)-C) or to the individual components before they are mixed.

The viscosity of the binder compositions of the invention, measured immediately after the combining of components A) to C) and of all optional constituents, is from 20 to 40 s (flow time from ISO 5 mm cup at 23° C.) for a solids content of from 50 to 70% by weight.

Depending on the reactivity of components A)+B) with the polyisocyanate component C) the binder compositions of the invention have a relatively long pot life.

The paint films produced from the binder compositions of the invention are dried at room temperature, with in principle no need for increased temperature. In order to shorten the drying or curing time it is of course possible, depending on field of application and on substrate, to apply a temperature increase to from 60 to 120° C. for a period of from 10 to 60 minutes.

In the ready-to-apply state the paints based on the binder combinations of the invention feature a high solids and low solvent contents in conjunction with a low viscosity.

The paint films which result after curing have high hardness, very good low-temperature elasticity, excellent weathering, solvent and chemical resistance, very good scratch resistance, and high gloss. The curing times, both for initial physical drying and for chemical crosslinking, are short, and so utility articles coated accordingly are very soon resistant to solvents and other chemicals and can be taken into service. Particularly surprising is the very good low-temperature flexibility of the coatings in conjunction with nigh hardness and very good resistance to solvents and other chemicals. These are normally conflicting properties, which to date it was impossible to achieve at one and the same time.

The coating compositions of the invention are therefore particularly suitable for the painting of plastics, particularly external mounted plastics components in the automobile industry. In view of the high paint film hardnesses that are achievable, however, the coating compositions of the invention are also highly suitable for the coating of metals, such as in the painting of large vehicles, such as aircraft, rail carriages, tramcars, lorry bodies and the like. A further preferred field of use consists in their application as automotive OEM and refinish paint. The paints are additionally suitable for corrosion protection applications, such as the coating of bridges and power masts, for example, for general industrial coating, for the coating of wood and furniture, and for coating glass The binder compositions of the invention are applied by usual methods, for example by spraying, pouring, dipping, flowcoating, brushing, squirting or rolling. The paints of the invention are suitable both for producing primers and for producing tie coats, and also for producing topcoats, particularly clearcoats, on the substrates that are to be painted.

Examples of suitable substrates include primed or unprimed plastics but also metals, woods, wood substitutes such as chipboard or fibreboard, glasses, stone, ceramic and concrete, for example.

EXAMPLES

All percentages are by weight unless noted otherwise.

Characteristics determined were the solids content (thick-layer method: lid, 1 g sample, 1 h 125° C. in a convection oven, based on DIN EN ISO 3251), the acid number (mg KOH/g sample, titration with 0.1 mol/l NaOH solution, based on DIN 53402), the viscosity (rotational viscometer VT 550 from Haake GmbH, Karlsruhe, DE, MV-DIN cup for viscosity <10 000 mPas/23° C.), the OH number (mg KOH/g sample, acetylation, hydrolysis, titration with 0.1 mol/l NaOH, based on DIN 53240) and the Hazen colour number (Hazen colour number to DIN 53995, colour number measuring instrument Lico® 400, Dr. Lange GmbH, Berlin, DE). The acid number and OH number are stated both for the as-supplied form (asf) and for the solid resin (SR). The OH content can be calculated from the OH number by dividing by 33.

Example 1

Preparation of the Polyester Polyols A) Essential to the Invention

Polyester Polyol A1)

1525 g of neopentyl glycol, 665 g of trimethylolpropane, 396 g of 1,2-propanediol, 1033 g of maleic anhydride, 1420 g of adipic acid and 0.45 g of Fascat® 4100 (Elf Atochem Vlissingen B. V., Vlissingen-Oost NL) were charged to a 5 l stirred tank equipped with a stirrer, a distillation bridge with column, and a nitrogen inlet tube and were heated to 200° C. subject to an overhead-temperature limit of max. 102° C. During the heating phase an hourly volume of $N_2$ equal to twice the volume of the tank was passed through the tank. The water of reaction was eliminated and towards the end of its elimination a liquid-phase temperature of 200° C. was reached. Condensation was then continued at 200° C. until an acid number of ≦3 mg KOH/g was reached. This gave 3980 g of a polycondensation product having an acid number of 2.7 mg KOH/g and an OH number of 175 mg KOH/g. 3600 g of this resin were admixed at 120° C. with 900 g of butyl acetate, while stirring. This gave a solution having a solids content of 80% by weight, an acid number of 2.1 mg KOH/g, an OH number of 140 mg KOH/g and a viscosity of 2595 mpa·s.

Polyester Polyol A2)

1712 g of 1,6-hexanediol, 486 g of trimethylolpropane, 1507 g of isophthalic acid, 527 g of adipic acid and 268 g of phthalic anhydride were charged to a 5 l stirred tank equipped with a stirrer, a distillation bridge with column, and a nitrogen inlet tube and were heated to 230° C. subject to an overhead-temperature limit of max. 102° C. During the heating phase an hourly volume of $N_2$ equal to twice the volume of the tank was passed through the tank. The water of reaction was eliminated and towards the end of its elimination a liquid-phase temperature of 230° C. was reached. Condensation was then continued at 230° C. until an acid number of $\leq 3$ mg KOH/g was reached. This gave 3990 g of a polycondensation product having an acid number of 2.5 mg KOH/g and an OH number of 180 mg KOH/g. 3600 g of this resin were admixed at 120° C. with 900 g of butyl acetate, while stirring. This gave a solution having a solids content of 80% by weight, an acid number of 2.0 mg KOH/g, an OH number of 144 mg KOH/g and a viscosity of 2350 mPa·s.

Example 2

Polyol B1:
A reactor as in Example 1 was charged with 3155 g of trimethylolpropane and 1345 g of ε-caprolactone and 2.2 g of dibutyltin dilaurate (DBTL). The contents of the tank were heated to 160° C., stirred at 160° C. for 6 hours and then cooled to 20° C., giving a resin having the following characteristics:
   Solids content: 99.5% by weight
   Viscosity at 23° C.: 4100 mPa·s
   Acid number: 0.5 mg KOH/g
   Hydroxyl number: 881 mg KOH/g
   Hydroxyl content: 26.7% by weight
   Hazen colour number: 44 APHA
   Appearance: clear Polyol B2
In analogy to polyol B1, 2012 g of glycerol and 2488 g of ε-caprolactone were reacted in the presence of 2.2 g of DBTL. This gave a resin having the following characteristics:
   Solids content: 99.4% by weight
   Viscosity at 23° C.: 1091 mPa·s
   Acid number: 0.9 mg KOH/g
   Hydroxyl number: 840 mg KOH/g
   Hydroxyl content: 25.5% by weight
   Hazen colour number: 32 APHA
   Appearance: clear Polyol B3
In analogy to polyol B1, 1266 g of trimethylolpropane and 3231 g of ε-caprolactone were reacted in the presence of 2.2 g of DBTL. This gave a resin having the following characteristics:
   Solids content: 99.9% by weight
   Viscosity at 23° C.: 1631 mPa·s
   Acid number: 0.6 mg KOH/g
   Hydroxyl number: 356 mg KOH/g
   Hydroxyl content: 10.8% by weight
   Hazen colour number: 16 APHA
   Appearance: clear Polyol B4
In analogy to polyol B1, 1757 g of trishydroxyethyl isocyanurate and 2743 g of E-caprolactone were reacted in the presence of 2.2 g of DBTL. This gave a resin having the following characteristics:
   Solids content: 99.5% by weight
   Viscosity at 23° C.: 3245 mPa·s
   Acid number: 1.0 mg KOH/g
   Hydroxyl number: 300 mg KOH/g
   Hydroxyl content: 9.1% by weight
   Hazen colour number: 52 APHA
   Appearance: clear Polyol B5
Desmophen®C 200, a solvent-free aliphatic polycarbonate ester having a hydroxyl content of 1.7% by weight, product of Bayer AG, Leverkusen, DE.

Comparative Example 1

Preparation of a Polyol Binder Based on a Polyacrylate Polyester Polyol Blend as V1

Preparation of the Polyacrylate Polyol D1:
1575 g of butyl acetate were charged to a 5 l stainless steel pressure reactor with stirrer, distillation apparatus, reservoir vessels for monomer mixture and initiator, including metering pumps, and automatic temperature regulation and this initial charge was heated to 150° C. Then, by means of separate feeds, beginning at the same time, a monomer mixture consisting of 1110 g of styrene, 862 g of hydroxyethyl methacrylate, 650 g of butyl acrylate and 26 g of acrylic acid was metered in over 3 hours and an initiator solution consisting of 97 g of di-tert-butyl peroxide and 180 g of butyl acetate was metered in over 3.5 hours, the polymerization temperature being held constant (±2° C.). Thereafter the mixture was stirred at 150° C. for 60 minutes and then cooled to room temperature, and its solids content determined. The copolymer was intended to have a solids content of 60±1%. A solids content of 60.8% by weight was found. Subsequently the copolymer was filtered through a filter (Supra T5500, pore size 25-72 μm, Seitz-Filter-Werke GmbH, Bad Kreuznach, DE). This gave a polymer solution having the following characteristics:
   Solids content: 61.0%
   Viscosity at 23° C.: 2412 mPa·s
   Acid number, asf/SR: 7.0/11.5 mg KOH/g
   Hydroxyl number, asf/SR: 83/136 mg KOH/g
   Hazen colour number: 15 APHA
   Appearance: clear Preparation of a Polyester Polyol A3:
877 g of 2-ethylhexanoic acid and 1853 g of trimethylolpropane were charged to a
5 l stirred tank equipped with a stirrer, a distillation bridge with column, and a nitrogen inlet tube and were heated to 125° C. During the heating phase an hourly volume of $N_2$ equal to the volume of the tank was passed through the tank. At 125° C., 1282 g of hexahydrophthalic anhydride and 488 g of adipic acid were added, the $N_2$ stream was increased to twice the tank volume/h, and the mixture was heated to 210° C. subject to an overhead-temperature limit of max. 102° C. The water of reaction was eliminated and towards the end a liquid-phase temperature of 210° C. was reached. Condensation was then continued at 210° C. until an acid number of $\leq 10$ mg KOH/g was reached. This gave 3980 g of a polycondensation product having an acid number of 9.6 mg KOH/g and an OH number of 180 mg KOH/g. 3375 g of this resin were admixed with 1125 g of xylene, while stirring. This gave a solution having a solids content of 75% by weight, an acid number of 7.1 mg KOH/g, an OH number of 135 mg KOH/g and a viscosity of 4661 mPa·s.

Preparation of a Polyacrylate-Polyester Polyol Blend V1:
2965 g of the polyacrylate polyol D and 1575 g of the polyester polyol A3 were stirred at 60° C. in a 5 l stirred tank for 1 hour, then cooled to 30° C. and filtered (Supra T5500, pore size 25-72 μm, Seitz-Filter-Werke GmbH, Bad Kreuznach, DE). This gave a polyester/polyacrylate solution, 65% in butyl acetate/xylene (3:1), having the following characteristics:
Solids content: 65.1%
Viscosity at 23° C.: 3682 mPa·s
Acid number, asf/SR: 7.0/10.7 mg KOH/g
Hydroxyl number, asf/SR: 101/155 mg KOH/g
Hazen colour number: 25 APHA
Appearance: clear Comparative Example 2

Comparison polyol V2 was Desmophen® A 575, an elasticized polyacrylate polyol having a solids content of 75% in xylene, a viscosity of 3500 mPa·s and a hydroxyl content of approximately 2.8% by weight (based on as-supplied form), product of Bayer AG, Leverkusen, DE.

Example 3

Preparation of the mixtures essential to the invention of type AB from the polyesters A1 and A2 and the lactone-based polyols B1-B5

Polyesters of type A and polyols of type B were stirred together with one another in the stated proportions at 60° C. for 60 minutes and then adjusted with butyl acetate to a solids content of 80% by weight.

Polyol AB1:
Mixture of polyester A1 and polyol B1 in a ratio of 90:10 (based on resin solids). This gave a polyol resin having the following characteristics:
Solids content: 80.0% by weight
Viscosity at 23° C.: 2732 mPa·s
Acid number, asf/SR: 1.0/1.3 mg KOH/g
Hydroxyl number, asf/SR: 193/241 mg KOH/g
Hazen colour number: 33 APHA
Appearance: clear Polyol AB2:
Mixture of polyester A1 and polyol B1 in a ratio of 85:15 (based on resin solids). This gave a polyol resin having the following characteristics:
Solids content: 80.9% by weight
Viscosity at 23° C.: 2853 mPa·s
Acid number, asf/SR: 0.5/0.6 mg KOH/g
Hydroxyl number, asf/SR: 227/281 mg KOHIg
Hazen colour number: 53 APHA
Appearance: clear Polyol AB3:
Mixture of polyester A2 and polyol B1 in a ratio of 90:10 (based on resin solids). This gave a polyol resin having the following characteristics:
Solids content: 79.9% by weight
Viscosity at 23° C.: 1561 mPa·s
Acid number, asf/SR: 1.5/1.9 mg KOH/g
Hydroxyl number, asf/SR: 221/277 mg KOH/g
Hazen colour number: 27 APHA
Appearance: clear Polyol AB4:
Mixture of polyester A2 and polyol B1 in a ratio of 85:15 (based on resin solids). This gave a polyol resin having the following characteristics:
Solids content: 79.6% by weight
Viscosity at 23° C.: 1501 mPa·s
Acid number, asf/SR: 2.2/2.8 mg KOH/g
Hydroxyl number, asf/SR: 211/265 mg KOH/g
Hazen colour number: 26 APHA
Appearance: clear Polyol AB5:
Mixture of polyester A1 and polyol B2 in a ratio of 85:15 (based on resin solids). This gave a polyol resin having the following characteristics:
Solids content: 80.0% by weight
Viscosity at 23° C.: 2442 mPa·s
Acid number, asf/SR: 0.5/0.6 mg KOH/g
Hydroxyl number, asf/SR: 195/244 mg KOH/g
Hazen colour number: 10 APHA
Appearance: clear Polyol AB6:
Mixture of polyester A2 and polyol B3 in a ratio of 9:1 (based on resin solids). This gave a polyol resin having the following characteristics:
Solids content: 80.3% by weight
Viscosity at 23° C.: 1852 mPa·s
Acid number, asf/SR: 1.6/2.0 mg KOH/g
Hydroxyl number, asf/SR: 134/167 mg KOH/g
Hazen colour number: 29 APHA
Appearance: clear Polyol AB7:
Mixture of polyester A1 and polyol B5 in a ratio of 95:5 (based on resin solids). This gave a polyol resin having the following characteristics:
Solids content: 80.1% by weight
Viscosity at 23° C.: 3223 mPa·s
Acid number, asf/SR: 0.5/0.6 mg KOH/g
Hydroxyl number, asf/SR: 130/162 mg KOH/g
Hazen colour number: 65 APHA
Appearance: clear Polyol AB8:
Mixture of polyester A2 and polyol B2 in a ratio of 9:1 (based on resin solids). This gave a polyol resin having the following characteristics:
Solids content: 79.8% by weight
Viscosity at 23° C.: 1101 mPa·s
Acid number, asf/SR: 2.2/2.8 mg KOH/g
Hydroxyl number, asf/SR: 165/209 mg KOH/g
Hazen colour number: 87 APHA
Appearance: clear As compared with the comparison polyols (V1 and V2 and also the straight polyesters A1 and A2) the AB-type polyol mixtures of the invention are distinguished by a generally lower viscosity in conjunction with higher solids content and by a consistently higher hydroxyl content.

Example 4

Coating Tests
Polyols AB1-AB5 were used as polyol mixtures for use in accordance with the invention. For comparison, use was made of comparison polyols V1 and V2 and of polyesters A1 and A2, albeit not inventively in combination with a polyol of type B.

To assess the coating properties clearcoat paints were prepared. That was done by admixing the polyol mixtures AB1-AB5 and also the comparison polyols V1, V2, A1 and A2 with 0.1% by weight of Baysilone® OL 17 (levelling agent from Borchers GmbH, Langenfeld, DE), 0.4% by weight of BYK 141® (defoamer from BYK-Chemie, Wesel, DE), 1.0% by weight of Tinuvin® 1130 (UV absorber from Ciba Geigy, Basel, CH, 10% by weight in methoxypropyl acetate (MPA)) and 1.0% by weight of Tinuvin® 292 (light stabilizer from Ciba Geigy, Basel, CH, 10% by weight in MPA) (the amounts in % are based in each case on the underlying amount of resin solids).

Shortly prior to application a paint polyisocyanate C) was added, maintaining an NCO/OH ratio of approximately 1.1:1, and the paint was adjusted with a mixture of butyl acetate/methoxypropyl acetate (MPA) 2:1 to a viscosity of approximately 25 s (flow time from DIN-4 mm cup at 23° C.). Before being processed, the paint was left to stand for about a further 10 to 15 minutes for the purpose of devolatilization.

The paint polyisocyanate used was Desmodur® N 3390 (Bayer AG, Leverkusen, DE), a polyisocyanate containing isocyanurate groups and based on 1,6-diisocyanatohexane, as a 90% solution in butyl acetate/Solvesso® 100 (Esso AG, Cologne, DE) (1:1); NCO content of the solution: about 19.4% by weight.

The paints were applied by spraying using a standard commercial spray gun from SATA Farbspritztechnik GmbH Kornwestheim, DE with a 1.4 mm nozzle at a pressure of about 2 bar in one cross-pass to the respective prepared substrate (in the case of glass, to a basecoat from Spies Hecker GmbH, Cologne, DE with the designation MB 501 white; in the case of aluminium panels measuring 300×150 mm, to a basecoat from Spies Hecker GmbH, Cologne, DE with the designation Tiefschwarz [deep black] RAL 9005). After a flash-off time of 10 to 15 minutes the paints were cured at 80° C. for 45 minutes and then stored at 60° C. for 16 h. The dry film thickness was 40±5 μm. Coatings testing was commenced 2 hours after storage.

On glass, determinations were made of the film hardness [König pendulum damping (DIN EN ISO 1522)], gloss and haze at a 20° angle (DIN 67 530, ISO 2813), the susceptibility to incipient dissolution by xylene, methoxypropyl acetate (MPA), ethyl acetate and acetone, and the tar resistance of the coating materials, using a special tar solution (DBL 7399) from DaimlerChrysler AG, Stuttgart, DE. On aluminium panels the resistance to tree resin, brake fluid, pancreatin (50% strength), sodium hydroxide solution (1% strength) and sulphuric acid (1% strength), the petrol resistance (DIN 51604), the scratch resistance (DIN 55668) and the thermal yellowing stability (DIN 6174) were tested.

Additionally, for testing the cold flexibility, the coating materials were applied by spraying to primed plastic sheets, 3 mm thick, made of Bayflex® 91 (Bayer AG, Leverkusen, DE); the sheets were dried at 80° C. for 45 minutes and stored at room temperature for 14 days; the dry film thickness was approximately 35 μm.

Strips produced from these sheets and measuring 2 cm in width and 15 cm in length were stored at different temperatures (room temperature; 5° C. to 45° C. in 5° C. steps) in a chill chamber for about 30 minutes and subsequently, at the relevant temperature in the chamber, were bent around a 1-inch mandrel in such a way that the two ends of the test strip made contact. The temperature at which the paint film tears is taken as a measure of the cold flexibility. According to this test, the paints prepared from polyols AB1 to AB5 met exacting elasticity requirements even at low temperatures.

The test results of the paints of the invention are set out in Table 1 below, and the test results of the comparison paints in Table 2 below.

TABLE 1

Test results for the paints of the invention

| Polyol | AB1 | AB2 | AB3 | AB4 | AB5 |
|---|---|---|---|---|---|
| Desmodur ® crosslinker | N 3390 | N 3390 | N 3390 | N 3390 | N 3390 |
| Spray solids [% by weight] | 63.4 | 63.1 | 63.6 | 63.5 | 63.3 |
| König pendulum damping [s] | 130 | 168 | 96 | 131 | 143 |
| Solvent resistance [rating][1] 1 min (xylene/MPA/EA/acetone) | 0 0 1 4 | 0 0 1 4 | 1 1 2 2 | 0 0 1 1 | 0 0 1 4 |
| Chemical resistance [° C.][2] | | | | | |
| Tree resin | 36 | 36 | 36 | 36 | 36 |
| Brake fluid | 36 | 36 | 36 | 36 | 36 |
| Pancreatin, 50% | 36 | 36 | 36 | 36 | 36 |
| Sodium hydroxide, 1% | 46 | 51 | 47 | 47 | 48 |
| Sulphuric acid, 1% | 42 | 44 | 43 | 44 | 43 |
| FAM petrol resistance, 10 min [rating][1] | 0 | 0 | 0 | 0 | 1 |
| Tar resistance (DBL 7399[3]) ΔE[4] | 3.9 | 2.4 | 20.4 | 13.8 | 2.8 |
| Scratch resistance (laboratory wash unit)[5] | | | | | |
| Initial gloss, 20° | 85.0 | 84.8 | 89.9 | 89.4 | 85.6 |
| Gloss after 10 cycles, 20° | 82.7 | 82.6 | 88.8 | 87.5 | 83.3 |
| Loss of gloss (Δgl.) after 10 cycles, 20° | 2.3 | 2.2 | 1.1 | 1.9 | 2.3 |
| Relative residual gloss (RR) [%] | 97.3 | 97.4 | 98.8 | 97.8 | 97.3 |

TABLE 1-continued

Test results for the paints of the invention

| Polyol | AB1 | AB2 | AB3 | AB4 | AB5 |
|---|---|---|---|---|---|
| Thermal yellowing | | | | | |
| Yellowing after 20 h at 120° C. [ΔE] | 2.3 | 1.8 | 1.6 | 1.3 | 1.9 |
| Flexural elasticity in ° C. | −25 | −20 | −40 | −35 | −25 |

[1] 0 = best score (no finding), 5 = worst score (paint film completely dissolved at the exposed site)
[2] Gradient oven method (the higher the temperature until damage is visible, the more resistant the paint film)
[3] Special tar solution from DaimlerChrysler AG, Stuttgart, DE for determining the tar resistance of automotive paints, having the following composition:
30.5% by weight Carbomasse EP KS ® (Rüttgerswerke AG, Hüls Troisdorf, DE)
62.0% by weight Edenol D 81 ® (Cognis Deutschland GmbH & Co. KG, Düsseldorf, DE)
2.7% by weight Santicizer 160 ® (FERRO Corp., Walton Hills, Ohio, US)
4.8% by weight Palatinol O ® (BASF AG, Ludwigshafen, DE)
[4] Tar solution exposure time: 24 h, followed by washing off with premium-grade petrol and assessing the difference between the contaminated area and an uncontaminated area.
[5] Age of the washing brush: about 36 hours of operation.

TABLE 2

Test results of the comparison paints:

| Polyol | V1 | V2 | A1 | A2 |
|---|---|---|---|---|
| Desmodur ® crosslinker | N 3390 | N 3390 | N 3390 | N3390 |
| Spray solids [% by weight] | 43.4 | 51.5 | 54.3 | 50.0 |
| König pendulum damping [s] | 209 | 119 | 56 | 35 |
| Solvent resistance [rating][1] 1 min (xylene/MPA/EA/acetone) | 0 0 0 1 | 1 1 3 4 | 2 2 4 4 | 2 2 3 4 |
| Chemical resistance [° C.][2] | | | | |
| Tree resin | 44 | 36 | 36 | 36 |
| Brake fluid | 36 | 36 | 36 | 36 |
| Pancreatin, 50% | 36 | 36 | 36 | 36 |
| Sodium hydroxide, 1% | 51 | 56 | 47 | 36 |
| Sulphuric acid, 1% | 47 | 44 | 43 | 44 |
| FAM petrol resistance, 10 min. [rating][1] | 0 | 1 | 1 | 1 |
| Tar resistance (DBL 7399[3] ΔE[4] | 0.3 | 12.7 | 16.2 | 35.1 |
| Scratch resistance (laboratory wash unit)[5] | | | | |
| Initial gloss, 20° | 89.1 | 88.5 | 84.6 | 88.3 |
| Gloss after 10 cycles, 20° | 71.4 | 84.5 | 82.2 | 87.6 |
| Loss of gloss (Δgl.) after 10 cycles, 20° | 17.7 | 4.0 | 2.4 | 0.7 |
| Relative residual gloss (RR) [%] | 80.1 | 95.5 | 97.2 | 99.2 |
| Thermal yellowing | | | | |
| Yellowing after 20 h at 120 ° C. [ΔE] | 1.8 | 2.1 | 2.0 | 1.2 |
| Flexural elasticity in ° C. | +10 | −15 | −35 | −45 |

[1] 0 = best score (no finding), 5 = worst score (paint film completely dissolved at the exposed site)
[2] Gradient oven method (the higher the temperature until damage is visible, the more resistant the paint film)
[3] Special tar solution from DaimlerChrysler AG, Stuttgart for determining the tar resistance of automotive paints, having the following composition:
30.5% by weight Carbomasse EP KS ® (Rüttgerswerke AG, Hüls Troisdorf, DE)
62.0% by weight Edenol D 81 ® (Cognis Deutschland GmbH & Co. KG, Düsseldorf, DE)
2.7% by weight Santicizer 160 ® (FERRO Corp., Walton Hills, Ohio, US)
4.8% by weight Palatinol O ® (BASF AG, Ludwigshafen, DE)
[4] Tar solution exposure time: 24 h, followed by washing off with premium-grade petrol and assessing the difference between the contaminated area and an uncontaminated area.
[5] Age of the washing brush: about 36 hours of operation.

The paints of the invention based on the polyols AB1-AB5 have a very high solids content at the predetermined application viscosity, and give coatings having good solvent resistance and chemical resistance. Petrol resistance, gloss, film hardness and thermal yellowing are at a high level, comparable with that of present-day standard systems (comparative experiments), which nevertheless have a substantially higher solvent content and hence a significantly lower solids content at application viscosity.

Decisive advantages are possessed by the paints of the invention based on the AB-type polyols in terms of the height of the solids content at application viscosity in comparison with all comparison polyols. In comparison with polyols A1 and A2 distinct advantages emerge for the AB-type polyols of the invention in terms of solvent resistance and chemical resistance, while being similar in low-temperature flexibility, and in terms of the film hardness of the resultant coatings. In comparison with polyols V1 and V2 distinct advantages emerge for the AB-type polyols of the invention in terms of low-temperature elasticity and scratch resistance, with similar scores in the solvent resistance and chemical resistance.

The test results therefore show clearly that clearcoat paints based on the polyol compositions of the invention have a much higher paint solids at given application viscosity than polyols of the prior art, and in addition to a comparable level of coatings properties the paint films have a much better solvent resistance and chemical resistance, with similar low-temperature elasticity, than 2K (2-component) PU paints based on standard polyols of type A1 and A2. In comparison with standard polyols of type V1 and V2 the polyols of the invention are similar in solvent and chemical resistance but have a much better low-temperature elasticity and scratch resistance. Accordingly the coating compositions of the invention are especially suitable for coating plastics and external mounted plastics components, and on the basis of the high paint film hardness are also especially suitable for metals, including in particular on motor vehicles, where a hybrid construction (plastic/metal) is frequently encountered.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. Binder compositions comprising
A) one or more polyester polyols having an OH number of from 50 to 300 mg KOH/g obtained by reacting a) 40 to 48 mol % of a carboxylic acid component comprising
   a1) one or more aliphatic, cycloaliphatic, araliphatic or aromatic carboxylic acids with a COOH functionality of $\geq 2$, or anhydrides thereof, and
   a2) optionally, aromatic, cycloaliphatic, araliphatic and/or aliphatic monocarboxylic acids
with
b) 52 to 60 mol % of an alcohol component comprising
   b1) one or more aliphatic, cycloaliphatic or araliphatic polyols with a number-average molecular weight of from 62 to 272 g/mol and an average OH functionality of a $\geq 2$, and
   b2) optionally, aliphatic, cycloaliphatic and/or araliphatic monoalcohols,
B) one or more lactone-based polyols having an average OH functionality of $\geq 2$,
C) one or more OH-reactive polyisocyanates which have an NCO functionality of $\geq 2$, contain urethane, uretdione, allophanate, biuret, iminooxadiazinedione and/or isooyanurate groups and are prepared from aliphatic and/or cycloaliphatic diisocyanates and
D) optionally solvents, auxiliaries and additives.

2. The binder compositions according to claim 1, wherein component a1) comprises at least one member selected from the group consisting of phthalic anhydride, isophthalic acid, adipic acid, maleic anhydride and hexahydrophthalic anhydride.

3. The binder compositions according to claim 1, wherein component a2) is present and comprises at least one member selected from the group consisting of 2-ethylhexanoic acid, saturated and unsaturated monofunctional $C_{16}$-$C_{18}$ fatty acids, benzoic acid and cyclohexanecarboxylic acid.

4. The binder compositions according to claim 1, wherein component b1) comprises at least one member selected from the group consisting of neopentyl glycol, hexane-1,6-diol, cyclohexanedimethanol, cyclohexane-1,2-diol, -1,3-diol and -1,4-diol, 2,2-bis(4-hydroxycyolohexyl)propane, octahydro-4,7-methano-1H-indenedimethanol, glycerol, trimethytolpropane, trimethylolethane, pentaerythritol and sorbitol.

5. The binder compositions according to claim 1, wherein component b2) is present and comprises at least one member selected from the group consisting of 1-hexanol, 2-ethylhexanol and cyclohexanol.

6. The binder compositions according to claim 1, wherein component B) comprises a polyol prepared from ε-caprolactone.

7. The binder compositions according to claim 6, wherein the ε-caprolactone-based polyols of component B) have an average OH functionality of $\geq 3$ and a number-average molecular weight of from 119 to 1500 g/mol, and component B has an OH content of from 9.0 to 36% by weight.

8. The binder compositions according to claim 1 wherein one or more polyisocyanates of component C is at least one member selected from the group consisting of 1,6-diisocyanatohexane, 1-isocyanato-3,3,5trimethyl-5-isocyanatomethylcycohexane (isophorone diisocyanate), 4,4-diisocyanatodicyclo-hexylmethane, 1,4-diisocyanatocyclhexane, 1-methyl-2,4-diiscocyanatocyclhexane, 1-methyl-2,6-diisocyanatocyclohexane, and 4-isocyanatomethyl-1,8-octane diisocyanat.

9. A method of coating primed or unprimed substrates, comprising applying a coating composition comprising the binder composition according to claim 1.

10. Coatings obtained from coating compositions comprising the binder compositions according to claim 1.

11. Substrates coated with coatings according to claim 10.

12. The binder compositions according to claim 1, wherein the auxiliaries and additives include one or more selected from the group consisting of plasticizers, pigments, fillers, catalysts, levelling agents, thickeners, thermal stabilizers, light stabilizers, and UV absorbers.

13. The binder compositions according to claim 1, wherein the solvents include one or more selected from the group consisting of ethyl acetate, n-propyl acetate, isopropyl acetate, n-butyl acetate, n-hexyl acetate, n-heptyl acetate, 2-ethyihexyl acetate, methoxypropyl acetate, methyl ethyl ketone, methyl isobutyl ketone, toluene, xylene, higher aromatics mixtures, white spirits, and mixtures thereof.

14. The binder compositions according to claim 2, wherein component a2) is present and comprises at least one member selected from the group consisting of 2-ethyihexanoic acid, saturated and unsaturated monofunctional $C_{16}$-$C_{18}$ fatty acids, benzoic acid and cyclohexanecarboxylic acid.

15. The binder compositions according to claim 2, wherein component b1) comprises at least one member selected from the group consisting of neopentyl glycol, hexane-1,6-diol, cyclohexanedimethanol, cyclohexane-1,2-diol, -1,3-diol and -1,4-diol, 2,2-bis(4-hydroxycyclohexyl)propane, octahydro-4,7-methano-1H-indenedimethanol, glycerol, trimethylolpropane, trimethylolethane, pentaerythritol and sorbitol.

16. The binder compositions according to claim 3, wherein component b1) comprises at least one member selected from the group consisting of neopentyl gycol, hexane-1,6-diol, cyclohexanedimethanol, cyclohexane-1,2-diol, -1,3-diol and -1,4-diol, 2,2-bis(4-hydroxycyclohexyl)propane, octahydro-4,7-metharto-1H-indenedimethanol, glycerol, trimethylolpropane, trimethylolethane, pentaerythritol and sorbitol.

17. The binder compositions according to claim 2, wherein component b2) is present arid comprises at least one member selected from the group consisting of 1-hexanol, 2-ethylhexanol and cyclohexanol.

18. The binder compositions according to claim 3, wherein component b2) is present and comprises at least one member selected from the group consisting of 1-hexanol, 2-ethyihexanol and cyclohexanol.

19. The method of claim 9, wherein the substrate comprises one or more materials selected from plastics, metals, woods, wood substitutes, glasses, stone, ceramic and concrete.

* * * * *